US010494991B2

(12) United States Patent
Van Nieuwstadt et al.

(10) Patent No.: US 10,494,991 B2
(45) Date of Patent: *Dec. 3, 2019

(54) TRANSIENT COMPENSATION FOR VARIABLE GEOMETRY COMPRESSOR

(71) Applicant: Ford Global Technologies, LLC, Dearborn, MI (US)

(72) Inventors: Michiel J. Van Nieuwstadt, Ann Arbor, MI (US); Devesh Upadhyay, Canton, MI (US); David R. Hanna, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

This patent is subject to a terminal disclaimer.

(21) Appl. No.: 15/653,448

(22) Filed: Jul. 18, 2017

(65) Prior Publication Data
US 2019/0024576 A1    Jan. 24, 2019

(51) Int. Cl.
*F02B 37/24*  (2006.01)
*F02M 26/05*  (2016.01)
*F02M 26/06*  (2016.01)
*F02B 37/18*  (2006.01)
*F02B 37/04*  (2006.01)
*F02B 37/00*  (2006.01)
*F04D 29/42*  (2006.01)
*F04D 29/68*  (2006.01)
(Continued)

(52) U.S. Cl.
CPC ............ *F02B 37/24* (2013.01); *F02B 37/004* (2013.01); *F02B 37/04* (2013.01); *F02B 37/18* (2013.01); *F02D 41/0007* (2013.01); *F02D 41/0072* (2013.01); *F02M 26/05* (2016.02); *F02M 26/06* (2016.02); *F04D 29/4213* (2013.01); *F04D 29/685* (2013.01); *F02B 2037/125* (2013.01); *F02D 41/1445* (2013.01); *F02D 2041/0017* (2013.01); *F02D 2041/0075* (2013.01); *F02D 2200/0406* (2013.01); *F02D 2200/606* (2013.01); *F02D 2200/701* (2013.01)

(58) Field of Classification Search
CPC ........ F02B 37/24; F02B 37/004; F02B 37/04; F02B 2037/125; F02B 37/18; F02B 37/186; F02M 26/04; F02M 26/05; F02M 26/06; F02M 26/16
USPC ..... 60/611, 602, 605.1–605.2; 701/104, 108; 415/58.4
See application file for complete search history.

(56) References Cited

U.S. PATENT DOCUMENTS 5,123,246 A    6/1992 Younessi et al.
6,067,800 A    5/2000 Kolmanovsky et al.
(Continued)

OTHER PUBLICATIONS

Zhou, J. et al., "Dynamic Steady-State Allocation for Over-Actuated Turbocharged Diesel Engines," 52nd IEEE Conference on Decision and Control, Dec. 10, 2013, Florence, Italy, 6 pages.
(Continued)

*Primary Examiner* — Thai Ba Trieu
(74) *Attorney, Agent, or Firm* — Geoffrey Brumbaugh; McCoy Russell LLP

(57) ABSTRACT

Methods and systems are provided for controlling a turbocharged engine. In one arrangement, a method may include concurrently adjusting an exhaust recirculation gas flow and a turbine flow while adjusting geometry of a compressor to compensate for disturbance caused by the compressor adjustment.

19 Claims, 8 Drawing Sheets

(51) Int. Cl.
*F02D 41/00* (2006.01)
*F02B 37/12* (2006.01)
*F02D 41/14* (2006.01)

(56) References Cited

U.S. PATENT DOCUMENTS

| | | | |
|---|---|---|---|
| 6,272,859 | B1 | 8/2001 | Barnes et al. |
| 6,378,307 | B1 * | 4/2002 | Fledersbacher ......... F02B 37/10 60/611 |
| 6,648,594 | B1 * | 11/2003 | Horner .................... F04D 25/04 415/58.4 |
| 7,076,953 | B2 | 7/2006 | Kreso |
| 7,328,577 | B2 * | 2/2008 | Stewart ............... F02D 41/0007 60/605.2 |
| 7,591,135 | B2 * | 9/2009 | Stewart ............... F02D 41/0007 60/605.2 |
| RE44,452 | E * | 8/2013 | Stewart ............... F02D 41/0007 60/605.2 |
| 8,517,664 | B2 | 8/2013 | Sun et al. |
| 9,346,469 | B2 * | 5/2016 | Glugla ................ F02D 41/2432 |
| 9,527,494 | B2 * | 12/2016 | Glugla .................. B60W 10/00 |
| 9,732,646 | B2 * | 8/2017 | Upadhyay ............. F01N 3/0232 |
| 9,863,336 | B2 * | 1/2018 | MacNeille ............. F02D 37/02 |
| 2007/0214787 | A1 | 9/2007 | Noelle et al. |
| 2014/0377051 | A1 | 12/2014 | Sun et al. |
| 2015/0224997 | A1 * | 8/2015 | Glugla ................ F02D 41/2432 701/54 |
| 2015/0337745 | A1 * | 11/2015 | MacNeille .............. F02D 37/02 123/406.48 |
| 2016/0160756 | A1 * | 6/2016 | McGahey ........... F04D 27/0238 415/145 |
| 2016/0201533 | A1 * | 7/2016 | Upadhyay ............. F01N 3/0232 701/102 |
| 2016/0214596 | A1 * | 7/2016 | Glugla .................. B60W 10/00 |
| 2018/0340544 | A1 * | 11/2018 | Hanna ................ F04D 27/0246 |
| 2018/0340784 | A1 * | 11/2018 | Upadhyay .......... G01C 21/3469 |
| 2018/0340785 | A1 * | 11/2018 | Upadhyay .......... G01C 21/3469 |

OTHER PUBLICATIONS

Van Nieuwstadt, M. et al., "Methods and System Diagnosing a Variable Geometry Compressor for an Internal Combustion Engine," U.S. Appl. No. 15/608,909, filed May 30, 2017, 36 pages.

Upadhyay, D. et al., "Method and System for Active Casing Treatment Control," U.S. Appl. No. 15/653,421, filed Jul. 18, 2017, 91 pages.

* cited by examiner

TRANSIENT COMPENSATION FOR VARIABLE GEOMETRY COMPRESSOR

FIELD

The present description relates generally to methods and systems for controlling the operation of variable geometry compressors coupled with internal combustion engines.

BACKGROUND/SUMMARY

Engines may use a turbocharger to provide boosted intake air for improved engine torque/power output density. The turbocharger may include a compressor coupled to an exhaust-driven turbine. The compressor may experience surge and/or choke depending on operating conditions. Surge may occur during low air mass flow, when the air flow through the compressor stalls or reverse. For example, compressor surge may occur responsive to heavy tip-outs or may occur under high exhaust gas recirculation (EGR) rates. Compressor surge may lead to noise, vibration, and harshness (NVH) issues such as undesirable noise from the engine intake system. Choke may occur when the air flow through the compressor cannot be increased for a given speed of the compressor. For example, compressor choke may occur responsive to aggressive tip-ins from an idle engine speed condition. During choke, the turbocharger cannot provide additional air to the engine, thus the engine power output density is temporarily limited.

Various approaches have been developed to expand the compressor operating range. One example approach including boosting air with a variable geometry compressor (VGC), wherein air flow through the compressor may be adjusted by changing geometry or position of the VGC. As an example, the pattern of air flow into the compressor may be adjusted by adjusting angle of vanes. As another example, air flow through the compressor may be modified with a passive casing treatment including immovable slots and/or ports. During low air mass flow conditions, the slot of the passive casing treatment may provide a path to recirculate partially pressurized air back to the compressor inlet. The recirculated air flowing through the compressor may enable the compressor to operate with a lower air mass flow rate before surge occurs. During high air mass flow conditions, the slots and/or ports of the passive casing treatment may provide a path to short-circuit air flow through the compressor so that the compressor may operate with a higher air mass flow rate before choke occurs. One drawback of passive casing treatment systems is that an effective location for a passive recirculation slot to prevent surge is different from an effective location for a passive recirculation slot to prevent choke.

Another example approach includes the use of an active casing treatment (ACT) for a compressor, such as shown by Sun et al. in U.S. Pat. No. 8,517,664. Therein, a turbocharger includes an active casing treatment, an impeller, a casing, and a diffuser. A controller adjusts a casing sleeve responsive to mass flow conditions relative to a threshold, or based on a pressure differential in the engine system, so that slots in the casing sleeve align with either a surge slot or a choke slot. Air is selectively allowed to flow between the impeller and the compressor inlet responsive to the slot alignment.

In addition to the issues noted above, the inventors herein have also recognized that changes in the geometry or position of the compressor may temporarily disturb engine operating parameters away from their desired setpoints. The transient disturbance may cause NVH and deteriorate engine performance. As an example, engine operating parameters may be controlled by operating actuators via a feedback control loop. Feedback control signals to the actuators may reflect compressor adjustment only when an error in the engine operating parameters has already occurred and has been sensed. In other words, response time of the feedback control loop may be slow. On the other hand, the process of adjusting compressor geometry or position may be fast relative to the response time of the feedback control loop. For example, the process of moving the casing sleeve of an ACT compressor to align with the surge slot or the choke slot may be abrupt and/or discrete. Therefore, the feedback controller may have limited bandwidth to compensate and reduce the disturbance caused by the compressor geometry adjustment, particularly as the controller is tuned to be responsive to numerous other disturbances and may be tuned to provide a certain drive feel responsive to driver-initiated disturbances. As a result, vibration and noise may occur responsive to each compressor geometry adjustment, and also torque disturbances may occur. Engine fuel economy and emission may likewise be affected. In one example, the issues described above may be addressed by a method comprising adjusting an EGR flow via a first actuator and a turbine flow via a second actuator while adjusting a geometry of a compressor, wherein the EGR flow and the turbine flow are adjusted based on the adjustment of the compressor geometry. In this way, disturbance in engine operating parameters responsive to compressor adjustment may be reduced and/or timely compensated.

As another example, engine gas flow and pressure may be controlled by adjusting the EGR flow and turbine flow via a feedback control loop during engine operation. In particular, the EGR flow and the turbine flow may be adjusted respectively by actuating a first actuator and a second actuator with control signals determined based on measured engine gas flow and pressure. Responsive to compressor surge or choke, geometry or position of the compressor may be adjusted via a compressor actuator to expand the compressor operating range. While actuating the compressor actuator to a desired position, the EGR flow and the turbine flow may be concurrently adjusted to offset the disturbance caused by the compressor geometry adjustment. For example, feedforward control signals may be subtracted from the feedback control signals to the first and second actuators while actuating the compressor actuator. The feedforward control signal may be determined based on an expected disturbance in the engine gas flow and pressure. As such, the engine gas flow and the pressure may be instantaneously adjusted responsive to compressor geometry change. The gas flow and the pressure may remain substantially constant (e.g., within 5% of the average) during compressor adjustment, thus reducing engine operating parameters deviation from the desired setpoints. After adjusting the compressor, the engine gas flow and pressure may be controlled by the feedback loop to a desired level. By sending the feedforward control signal to the first and second actuators concurrently with actuating the compressor, disturbances in engine gas flow and pressure may be reduced and can be preemptive of the disturbance onset.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
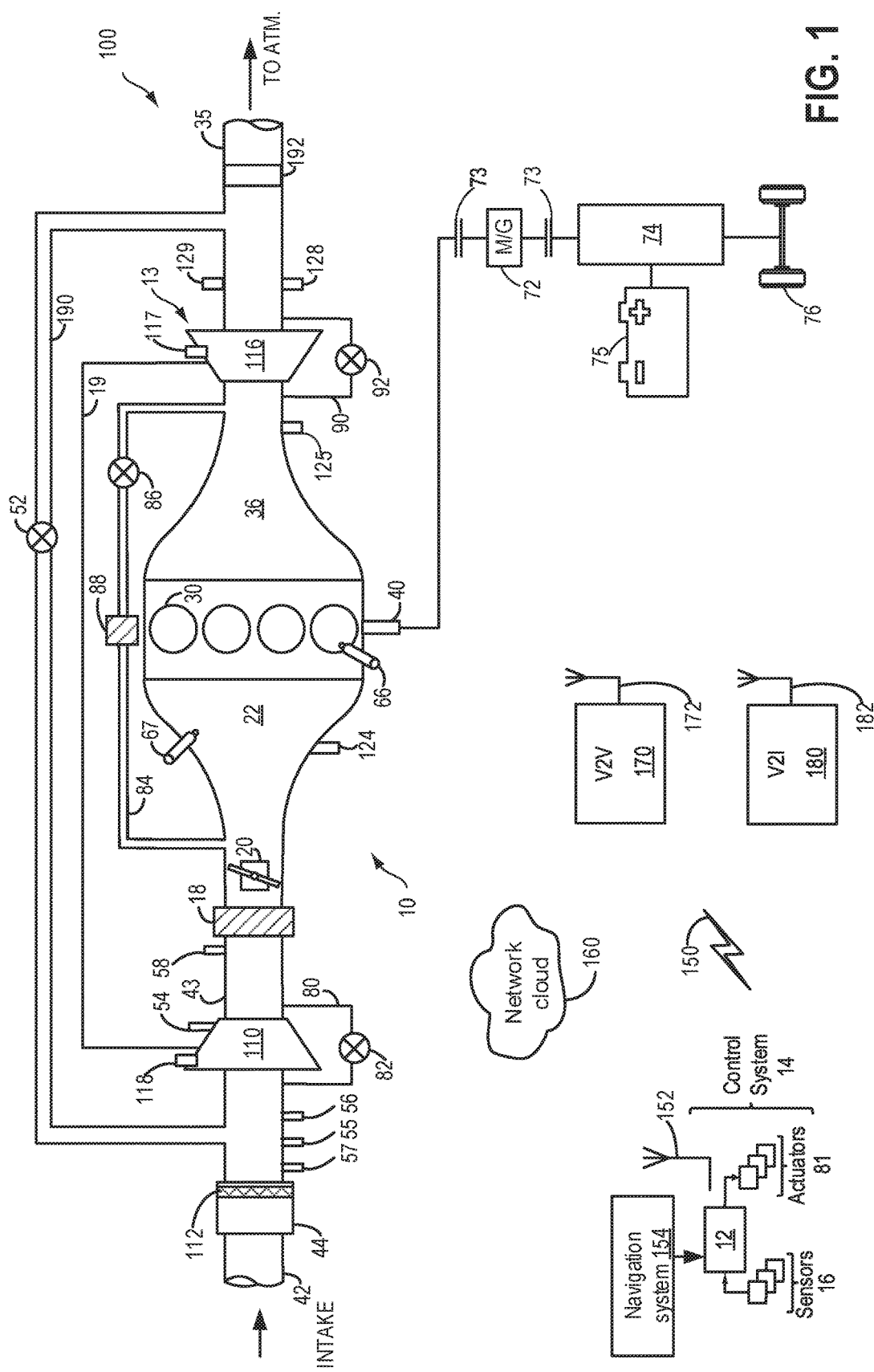
FIG. 1 shows an example embodiment of a vehicle system that includes a turbocharged engine.
Figure 2:
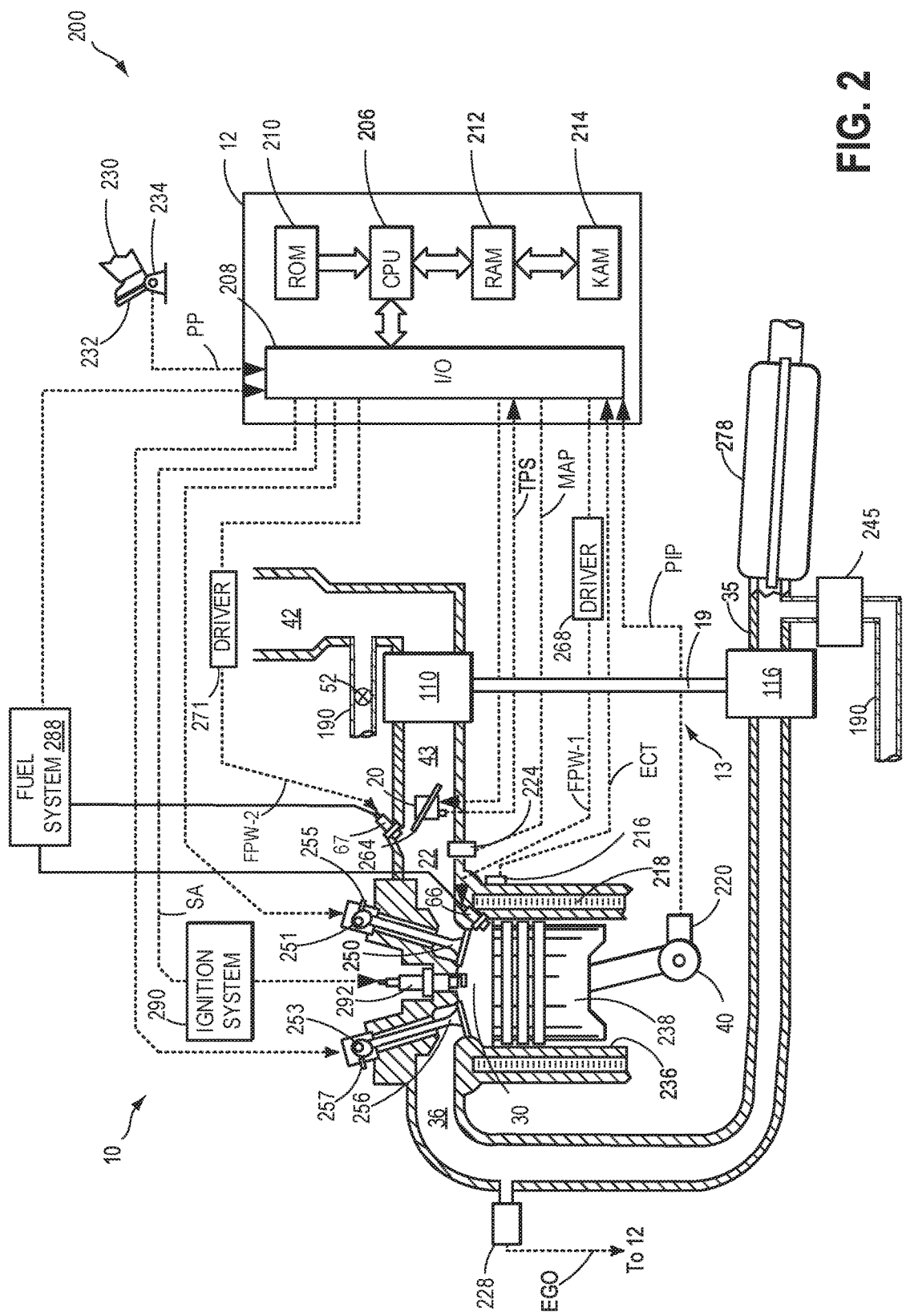
FIG. 2 shows a diagram of an example embodiment of one cylinder of the turbocharged engine of FIG. 1.
Figure 3:
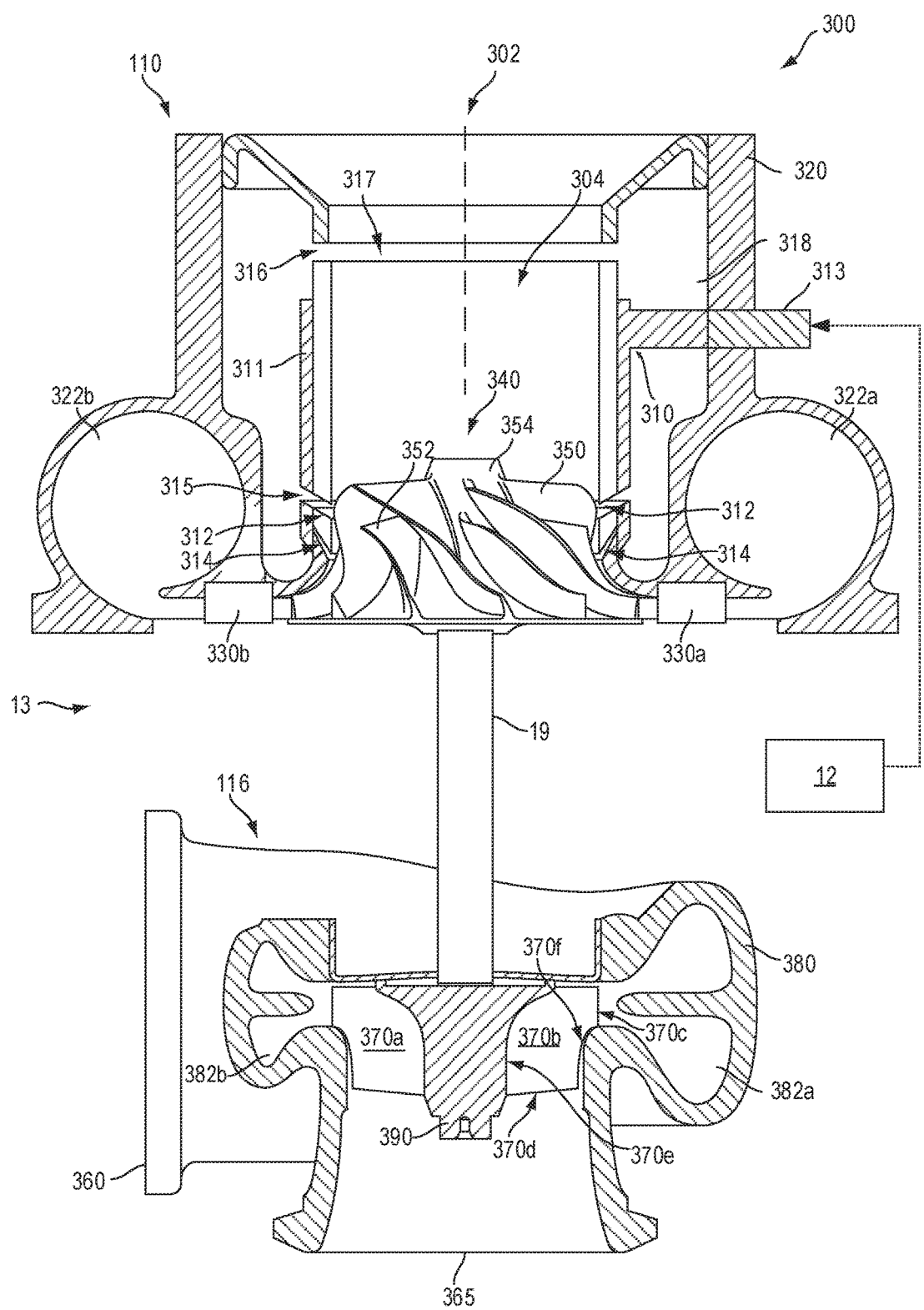
FIG. 3 shows a cut-away view of an example embodiment of the turbocharger of FIGS. 1 and 2.
Figure 5:
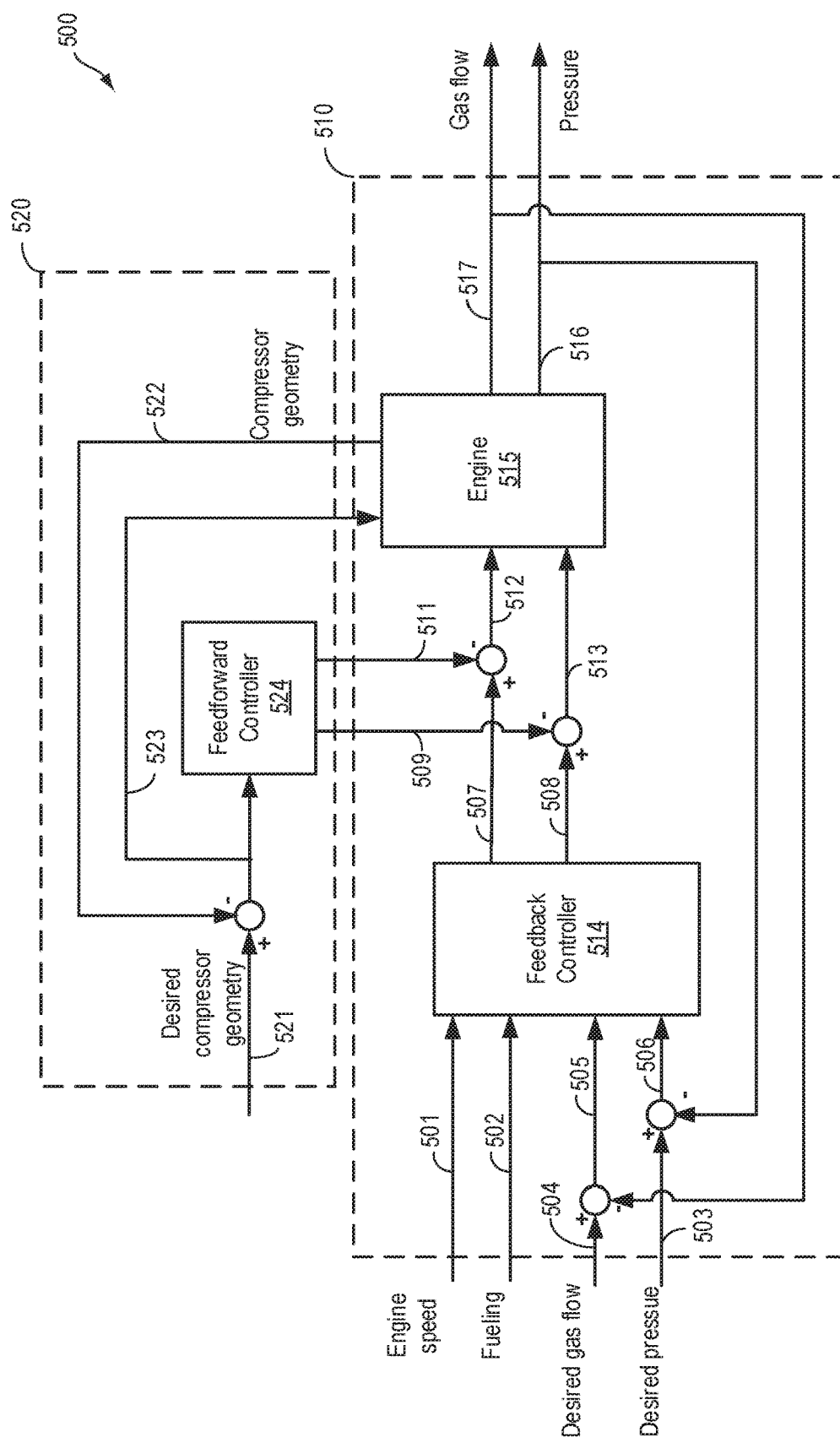
FIG. 5 shows control blocks of a turbocharged engine.
Figure 6:
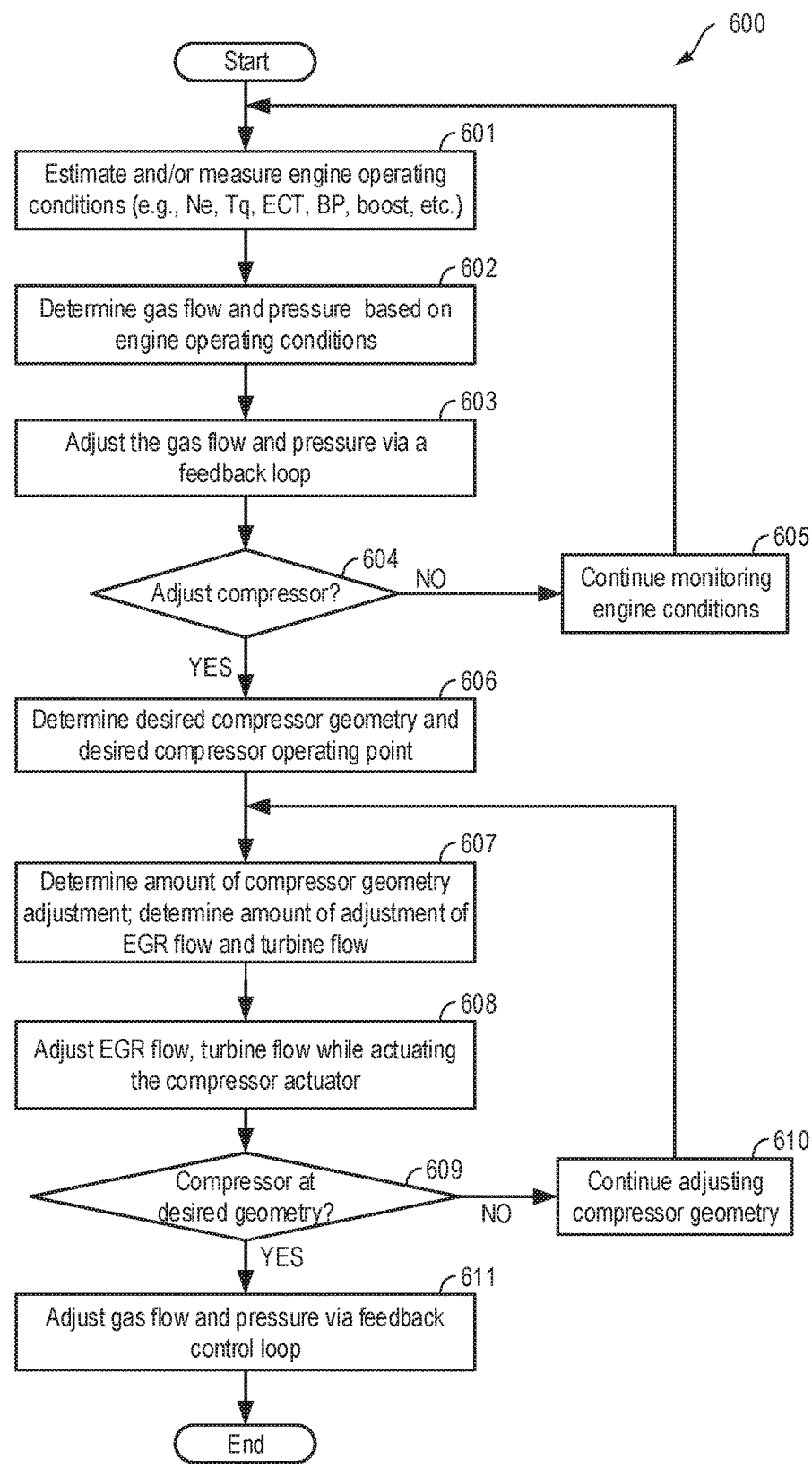
FIG. 6 shows an example method for controlling a turbocharged engine.
Figure 7:
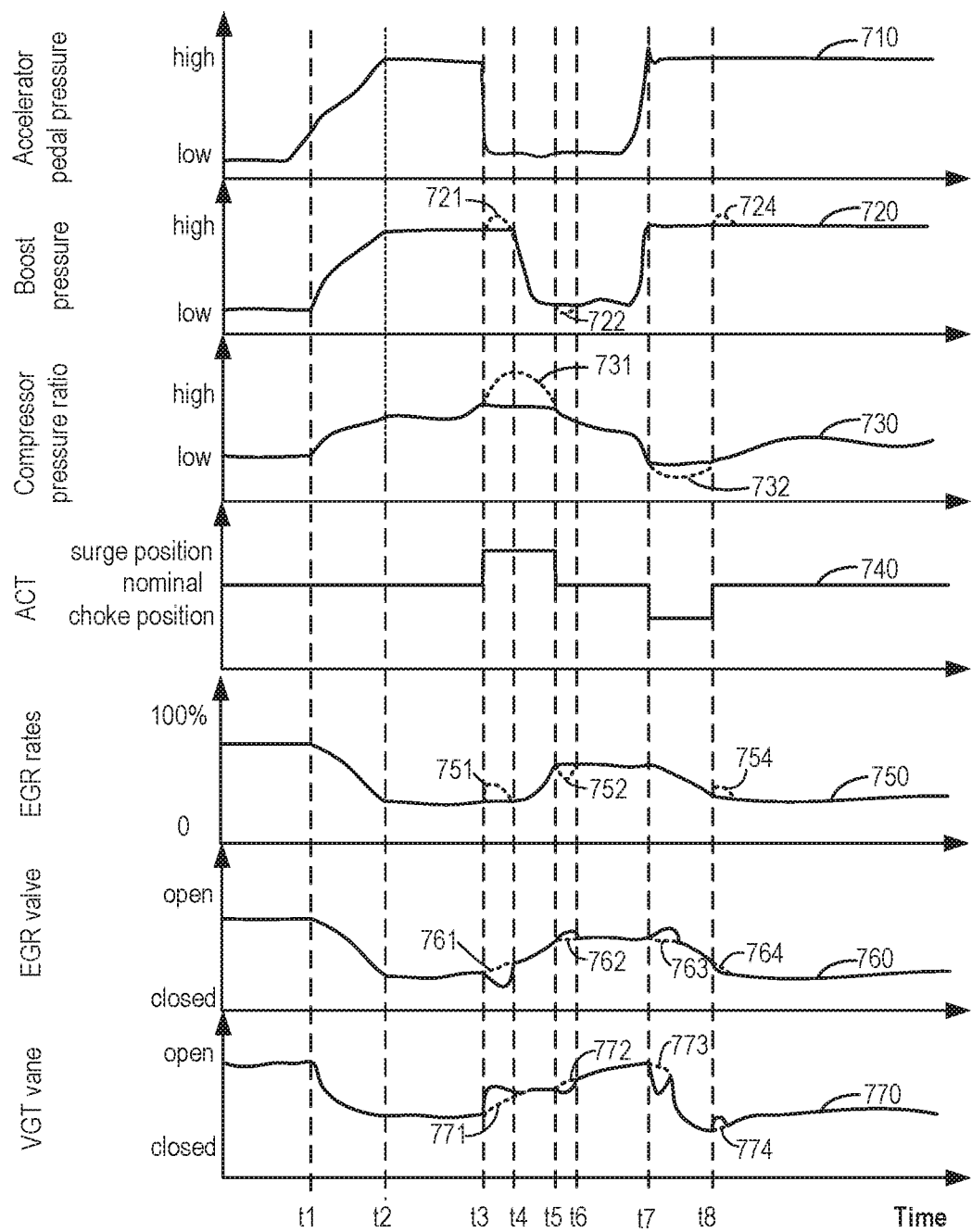
FIG. 7 shows variations in engine operating parameters and status of actuators over time while implementing the method of FIG. 6.
Figure 8:
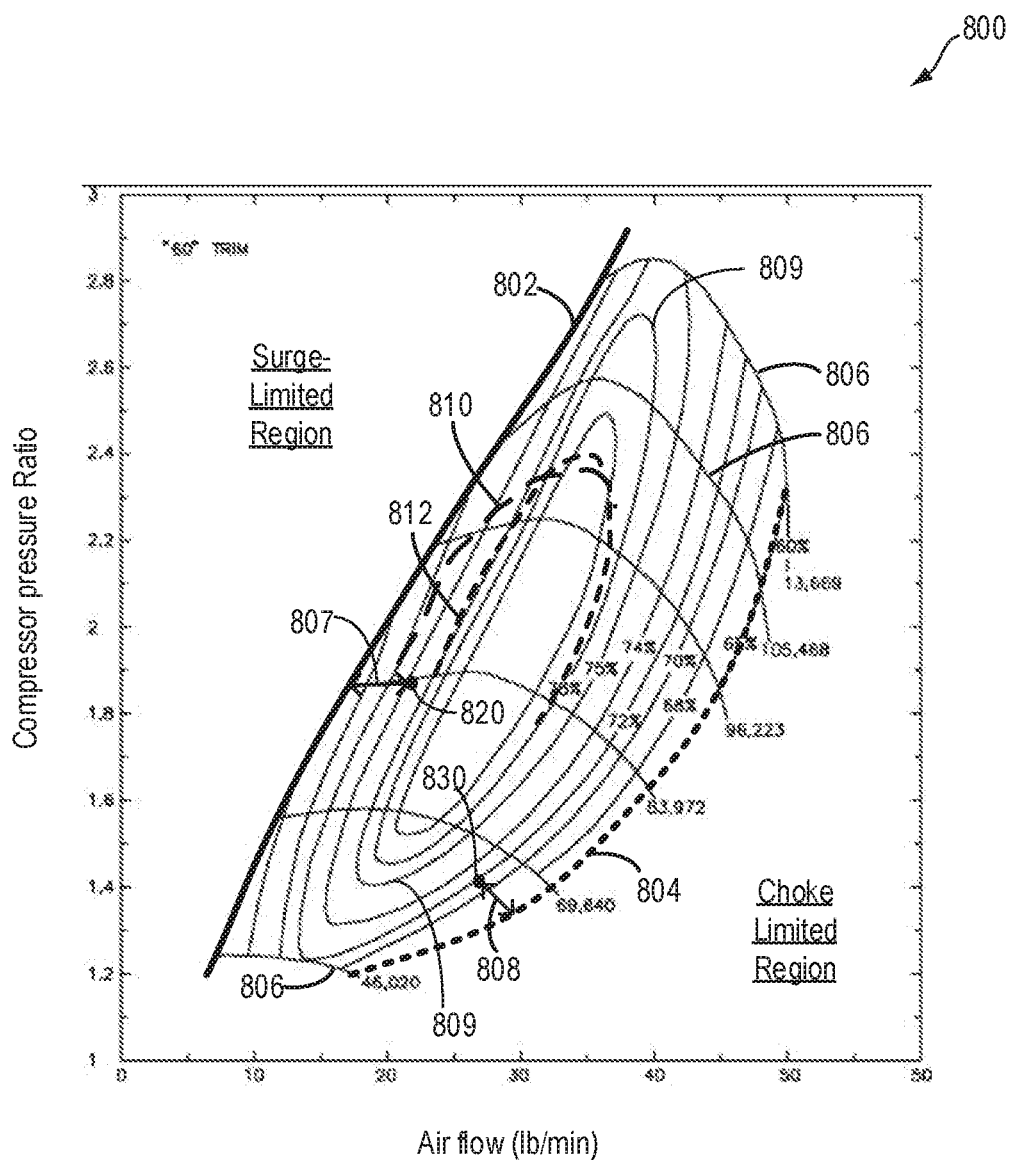
FIG. 8 shows an example compressor map.

The following description relates to systems and methods for controlling a turbocharged engine. An example vehicle system and an example cylinder within the vehicle system is shown in FIG. 1 and FIG. 2, respectively. In one example, the vehicle system may include a compressor coupled with a turbine as shown in FIG. 3. Geometry or position of the compressor may be adjusted to expand the compressor operating range responsive to an indication of compressor surge or choke. One example compressor is known in FIGS. 4A-4B, wherein compressor geometry may be adjusted by moving an active casing treatment. FIG. 5 shows an example control block for controlling engine operating parameters. The engine operating parameters such as engine gas flow and pressure may be controlled via a feedback control loop. Disturbance caused by the compressor adjustment may be compensated by introducing a feedforward control signal. An example method of controlling a turbocharged engine with a variable geometry compressor is shown in FIG. 6. In particular, responsive to expected compressor surge or choke, EGR flow and turbine flow are adjusted while actuating the compressor actuator to avoid disturbance in the engine operating parameters. Variations of engine operating parameters and status of actuators while implementing the method of FIG. 6 are illustrated in FIG. 7. FIG. 8 shows an example compressor map including surge and choke limits.

Turning now to FIG. 1, an example embodiment of a vehicle system 100 is illustrated schematically. In one example, vehicle system 100 may be configured as an on-road motor vehicle. However, it will be appreciated that in other examples vehicle system 100 may be configured as an off-road vehicle. In some examples, vehicle system 100 may be a hybrid vehicle with multiple sources of torque available to one or more vehicle wheels 76. In other examples, vehicle system 100 is a conventional vehicle with only an engine, or an electric vehicle with only electric machine(s). In the example shown, vehicle system 100 includes engine 10 and an electric machine 72. Electric machine 72 may be a motor or a motor/generator. Crankshaft 40 of engine 10 and electric machine 72 are connected via a transmission 74 to vehicle wheels 76 when one or more clutches 73 are engaged. In the depicted example, a first clutch 73 is provided between crankshaft 40 and electric machine 72, and a second clutch 73 is provided between electric machine 72 and transmission 74. Controller 12, discussed herein, may send a signal to an actuator of each clutch 73 to engage or disengage the clutch, so as to connect or disconnect crankshaft 40 from electric machine 72 and the components connected thereto, and/or connect or disconnect electric machine 72 from transmission 74 and the components connected thereto. Transmission 74 may be a gearbox, a planetary gear system, or another type of transmission. The powertrain may be configured in various manners including as a parallel, a series, or a series-parallel hybrid vehicle.

Electric machine 72 receives electrical power from a traction battery 75 to provide torque to vehicle wheels 76. Electric machine 72 may also be operated as a generator to provide electrical power to charge battery 75, for example during a braking operation. In other examples, where vehicle system 100 is a conventional vehicle with only an engine, traction battery 75 may be a starting-lighting-ignition (e.g., SLI) battery that supplies electrical energy to the vehicle system 100.

In the depicted embodiment, engine 10 is a turbocharged engine including a turbocharger 13. Turbocharger 13 comprises a turbine 116 positioned in the exhaust passage 35 coupled to a compressor 110 positioned in an intake passage 42. Turbine 116 and compressor 110 may be coupled via a shaft 19. Compressor 110 may be positioned upstream of a charge air cooler 18 (also referred to herein as CAC) and an intake throttle 20. Turbine 116 may be driven (e.g., spun) by expanding exhaust gases from engine 10, and the rotational energy of turbine 116 may be transferred via shaft 19 to rotate compressor 110.

Geometry of compressor 110 may be adjusted by operating compressor actuator 118. In one example, compressor 110 is a variable geometry compressor (VGC) having vanes that are moved in accordance with a desired vane angle to guide intake air flow into the compressor in different patterns. In addition, as elaborated with reference to FIG. 3 and FIGS. 4A-4B, compressor 110 may include an active casing treatment (ACT) with a sleeve that is actuatable between different positions to reduce or increase the flow into the compressor wheel (or impeller). For example, responsive to an indication of surge (actual or predicted), the sleeve may be actuated by an engine controller to a surge slot to increase flow out of the compressor wheel to the compressor inlet. In another example, responsive to an indication of choke (actual or predicted), the sleeve may be actuated by an engine controller to a choke slot to increase flow into the compressor wheel from the compressor inlet.

In some examples, turbine 116 may be a variable geometry turbine (VGT) having vanes whose angles are adjustable to guide exhaust flow through the turbine blades in different patterns, thereby varying turbine speed and boost pressure provided by turbocharger 13. Exhaust flow through turbine 116 may be adjusted via actuator 117.

Engine 10 receives air along intake passage 42 via an air box 44 including air cleaner 112. The air is compressed by the compressor 110 of turbocharger 13 and compressed air is delivered to induction passage 43. The compressed air passes through the induction passage 43, through the CAC 18 to cool, and through the throttle 20 before entering the intake manifold 22 where it enters the engine 10. In other words, compressor 110 is coupled through charge air cooler 18 to intake throttle 20 and intake throttle 20 is coupled upstream of intake manifold 22. The charge-air cooler may be an air-to-air or water-to-air heat exchanger, for example.

In the embodiment shown in FIG. 1, the pressure of the air charge within the intake manifold is sensed by a manifold air pressure (MAP) sensor 124.

It will be appreciated that other combinations and configurations of boosting devices may be possible. In one embodiment, engine system 100 may comprise a supercharger wherein compressor 110 may be at least partially driven by an electric machine and/or the engine 10, and the engine system may not include turbine 116. In still further examples, multiple boosting devices may be staged in series, such as where both a supercharger and a turbocharger are coupled to the intake passage.

Compressor 110 may include a recirculation passage 80 across the compressor. The depicted example shows a compressor recirculation valve (CRV) 82 coupled across the recirculation passage 80, where actuation of the CRV 82 adjusts the flow through the recirculation passage 80. Warm, compressed air from the compressor outlet may be recirculated back to the compressor inlet via recirculation passage 80. In some embodiments, the compressor recirculation system may alternatively, or additionally, include a recirculation passage for recirculating (cooled) compressed air from the compressor outlet, downstream of the charge air cooler to the compressor inlet or a compressor bypass for dissipating compressed air to atmosphere (not shown). The CRV 82 may be a continuously variable valve wherein a position of the valve is continuously variable from a fully closed position to a fully open position. In some embodiments, compressor recirculation valve 82 may be held partially open during boosted engine operation to provide some surge margin. Herein, the partially open position may be a default valve position. Increasing the opening of the compressor recirculation valve may include actuating (or energizing) a solenoid of the valve. Further discussion of example CRV operation will be discussed herein.

One or more sensors may be coupled to an inlet of the compressor 110 for determining a composition and condition of air charge entering the compressor. For example, an intake air temperature (IAT) sensor 55 may be coupled to the intake passage 42, proximate the inlet of the compressor 110, for estimating a compressor inlet temperature. As another example, a pressure sensor 56 may be coupled to the inlet of the compressor for estimating a pressure of air charge entering the compressor. In a further example, a mass airflow (MAF) sensor 57 may also be coupled to the inlet of the compressor for estimating the amount of air entering the engine. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the air charge recirculated from upstream of the CAC. A throttle inlet pressure (TIP) sensor 58 or other suitable sensor, may be coupled downstream of the compressor 110 and upstream of the throttle 20, for measuring the boost pressure at a location downstream of the compressor 110 and upstream of the throttle 20. In this way, a compressor outlet pressure may be determined. Compressor pressure ratio may be calculated by dividing the compressor outlet pressure with compressor inlet pressure (such as pressure measured by sensor 56).

Intake manifold 22 is coupled to a series of combustion chambers 30 through a series of intake valves (described further with reference to FIG. 2). The combustion chambers are further coupled to exhaust manifold 36 via a series of exhaust valves (described further with reference to FIG. 2). In the depicted embodiment, a single exhaust manifold 36 is shown. However, in other embodiments, exhaust manifold 36 may include a plurality of exhaust manifold sections. Configurations having a plurality of exhaust manifold sections may enable effluent from different combustion chambers to be directed to different locations in the engine system 10. Sensor 125 may be coupled to the exhaust manifold for measuring exhaust flow.

Combustion chambers 30 may be supplied by a fuel system (described further with reference to FIG. 2) with one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. Direct injection comprises injecting the fuel directly into the combustion chamber, and port injection delivers the fuel spray into the intake ports where it mixes with the intake air before entering the combustion chamber. The present example may include a plurality of direct fuel injectors 66 and port fuel injectors 67. In the combustion chambers, combustion may be initiated via spark ignition and/or compression ignition.

As shown in FIG. 1, exhaust gas from the one or more sections of exhaust manifold 36 is directed to turbine 116 to drive the turbine. When reduced turbine torque is desired, some exhaust may be directed instead through a waste-gate 90, bypassing the turbine 116. Waste-gate valve 92, coupled to waste-gate 90, may be actuated open to dump at least some exhaust pressure from upstream of the turbine 116 to a location downstream of the turbine via waste-gate 90. By reducing exhaust pressure upstream of the turbine 116, turbine speed may be reduced. In one embodiment, waste-gate valve 92 may be vacuum actuated, that is, it may be actuated via the application of vacuum. The combined flow from the turbine 116 and the waste-gate 90 then flows through emission control (described further with reference to FIG. 2) before all or part of the treated exhaust may be released into the atmosphere via exhaust passage 35.

Engine 10 may further include one or more exhaust gas recirculation (EGR) passages for recirculating a portion of exhaust gas from the exhaust manifold to the intake manifold. By recirculating some exhaust gas, an engine dilution may be affected which may improve engine performance by reducing engine knock, peak cylinder combustion temperatures and pressures, throttling losses, and NOx emissions. In the depicted example, exhaust gas may be recirculated from exhaust manifold 36, upstream of turbine 116, to intake manifold 22, downstream of compressor 110 and throttle 20 via EGR passage 84. This configuration may be known as a high pressure (HP) EGR system. EGR passage 84 may include an EGR valve 86 for controlling HP EGR flow and an EGR cooler 88 for cooling exhaust gas prior to delivery in the intake manifold. In still further examples, exhaust gas may be recirculated from exhaust passage 35, downstream of turbine 116, to intake passage 22, upstream of compressor 110, via a distinct EGR passage to provide low pressure (HP) EGR. An example of LP EGR is shown with reference to FIG. 1. As elaborated at FIGS. 6-7, following actuation of an ACT sleeve, one or more of the EGR valve and an additional boost actuator (such as waste-gate valve 92) may be actuated to reduce air flow disturbances incurred by the compressor ACT sleeve actuation.

Engine system 100 may further include control system 14 which includes controller 12. Controller 12 is shown receiving information from a plurality of sensors 16 (various examples of which are described herein) and sending control signals to a plurality of actuators 81 (various examples of which are described herein). As one example, sensors 16 may include MAP sensor 124, exhaust flow sensor 125, exhaust temperature sensor 128, exhaust pressure sensor 129, intake air temperature sensor 55, compressor inlet pressure sensor 56, manifold air flow sensor 57, and throttle inlet pressure sensor 58. Other sensors such as additional pressure, temperature, air/fuel ratio, and composition sensors may be coupled to various locations in engine system 10. In one example, a compressor speed sensor 54 may be coupled to compressor 110 to determine a rotational speed of the compressor. According to one non-limiting embodiment, compressor speed sensor 54 may be a passive eddy current sensor. In one example, compressor speed sensor 54 may be a passive eddy current sensor. The actuators 81 may include, for example, throttle 20, compressor recirculation valve 82, waste-gate valve 92, direct fuel injector 66, and port fuel injector 67.

Control system 14 may be coupled to navigation system 154 and wireless communication device 152. Navigation system 154 determines the location of vehicle system 100 at key-on and at any other instant of time. A location (e.g., GPS co-ordinates of the vehicle) of the vehicle system 100 as estimated by the navigation system 154 may be stored at the control system 14 for use during the driving cycle. The navigation system may be connected to an external server and/or network cloud 160 via wireless communication 150. The navigation system 154 may determine the current location of the vehicle system 100 and obtain traffic and road condition data from a network cloud 160 for use when controlling engine operation. In addition, based on an operator selected destination, the navigation system 154 may provide various path selection, and then provide turn-by-turn instructions for navigating the vehicle system from a current location (e.g., place of origin) to the selected destination.

Controller 12 may also receive input data via a wireless communication device 152 using wireless communication 150 from one or more of a network cloud 160, vehicle-to-vehicle technology (V2V) 170 and vehicle-to-infrastructure technology (V2I) 180. V2V 170 may allow control system 14 to communicate with other similarly equipped vehicles that include wireless communication device 172, to gather information on traffic and road conditions from infrastructure that includes a wireless communication device 182. In one example, V2V may indicate vehicle speeds along an intended route, such as whether other vehicles may be stopped ahead, or whether there is stop-and-go traffic along the current route relative to an alternate route. In another example, V2I may indicate an impending red traffic light or a traffic accident along the predicted route. In this way, vehicle system 100 may communicate with remote sources (e.g., external network cloud, other vehicles, infrastructure) using one or more technologies (e.g., wireless communication, navigation system, GPS, V2V, V2I).

Various kinds of data, including but not limited to gradient map data and upcoming traffic conditions may be exchanged among vehicles and the network cloud and this data may be utilized for controlling vehicle operation. In one example, based on navigation system 154 input, controller 12 may recognize a travel pattern. Specifically, controller 12 may "learn" that a vehicle operator travels the same route every weekday morning commuting to work. The controller may store data about the route, including road gradient information and/or expected traffic conditions, and along with a learned driver model, may actively control the compressor casing treatment in order to avoid a predicted choke or predicted surge condition. A learned driver model may be developed by storing data related to the habits of a vehicle operator. For example, over the course of several weekday commutes, the controller may learn that during morning commutes, the driver exhibits relatively moderate driving habits (e.g., as indicated by gradual and infrequent actuation of the accelerator pedal and brake pedal, resulting in gradual acceleration and sporadic braking). This type of driving behavior, herein referred to as a "moderate driver pattern," may result in a low energy density actuation of the accelerator pedal.

In this way, the on-board controller 12 may communicate with on-board controllers of other vehicles via their respective navigation systems 154, via wireless communication device 152, and/or via other forms of vehicle to vehicle technology (V2V).

The controller 12 may employ the actuators 81 in response to the processed input data received from the various sensor based on instructions stored in the memory of the controller or code programmed therein corresponding to one or more routines, such as the example method 600 of FIG. 6. As one example, controller 12 may determine whether operating conditions of compressor 110 are within a threshold of surge. In one example, to determine compressor operating conditions relative to a surge threshold, a pressure ratio across the compressor and a compressor speed may be determined. Responsive to compressor pressure being within a threshold margin of a defined surge limit of the compressor, controller 12 may send a control signal to actuator 117 to actuate a sleeve of an active casing treatment of compressor 110 in order to align the casing with a surge slot to provide a path to recirculate partially pressurized air back to the compressor inlet.

Turning now to FIG. 2, an example embodiment 200 of a combustion chamber (e.g., cylinder) of an internal combustion engine (such as engine 10 of FIG. 1) is shown. Components previously introduced in FIG. 1 may be similarly numbered. Engine 10 may receive control parameters from a control system including controller 12 and input from a vehicle operator 230 via an input device 232. In this example, input device 232 includes an accelerator pedal and a pedal position sensor 234 for generating a proportional pedal position signal PP. Cylinder (herein also "combustion chamber") 30 of engine 10 may include combustion chamber walls 236 with piston 238 positioned therein. Piston 238 may be coupled to crankshaft 40 so that reciprocating motion of the piston is translated into rotational motion of the crankshaft. Crankshaft 40 may be coupled to at least one drive wheel of the vehicle system via a transmission system.

Cylinder 30 can receive intake air via intake passage 42, induction passage 43, and intake manifold 22. Intake manifold 22 may communicate with other cylinders of engine 10 in addition to cylinder 30. In some embodiments, one or more of the intake passages may include a boosting device such as a turbocharger or a supercharger. For example, FIG. 2 shows engine 10 configured with turbocharger 13 including compressor 110 arranged between intake passage 42 and induction passage 43, and an exhaust turbine 116 arranged between exhaust manifold 36 and exhaust passage 35. Compressor 110 may be at least partially powered by exhaust turbine 116 via shaft 19 where the boosting device is configured as a turbocharger. As previously described, in examples where engine 10 is provided with a supercharger, exhaust turbine 116 may be optionally omitted, where compressor 110 may be powered by mechanical input from a motor or the engine 10. Throttle 20 may include a throttle plate 264, and may be provided along an intake passage of the engine for varying the flow rate and/or pressure of intake air provided to the engine cylinders. For example, throttle 20 may be disposed downstream of compressor 110 or alternatively may be provided upstream of compressor 110.

Exhaust manifold 36 may receive exhaust gases from other cylinders of engine 10 in addition to cylinder 30. Exhaust gas sensor 228 is shown coupled to exhaust manifold 36 upstream of emission control device 278, but it will be appreciated that it may be located at other locations in the exhaust system. Exhaust gas sensor 228 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 278 may be a three way catalyst (TWC), NOx trap, various other emission control devices, or combinations thereof.

Each cylinder of engine 10 may include one or more intake valves and one or more exhaust valves. For example, cylinder 30 is shown including at least one poppet-style intake valve 250 and at least one poppet-style exhaust valve 256 located at an upper region of cylinder 30. In some embodiments, each cylinder of engine 10, including cylinder 30, may include at least two intake poppet valves and at least two exhaust poppet valves located at an upper region of the cylinder.

Intake valve 250 may be controlled by controller 12 by cam actuation via cam actuation system 251. Similarly, exhaust valve 256 may be controlled by controller 12 via cam actuation system 253. Cam actuation systems 251 and 253 may each include one or more cams and may utilize one or more of cam profile switching (CPS), variable cam timing (VCT), variable valve timing (VVT), and/or variable valve lift (VVL) systems that may be operated by controller 12 to vary valve operation. Whether electronically actuated or cam actuated, the timing of exhaust and intake valve opening and closure may be adjusted as specified for desired combustion and emissions-control performance. The operation of intake valve 250 and exhaust valve 256 may be determined by valve position sensors (not shown) and/or camshaft position sensors 255 and 257, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. Additionally, a VCT system may include one or more VCT devices (not shown) that may be actuated to adjust the timing of the intake and exhaust valves to a timing that provides decreased positive intake to exhaust valve overlap. That is to say, the intake and exhaust valves will be open for a shorter duration and will move away from being simultaneously open for a portion of the intake stroke. In still other embodiments, the intake and exhaust valves may be controlled by a common valve actuator or actuation system, or a variable valve timing actuator or actuation system.

In some embodiments, each cylinder of engine 10 may include a spark plug 292 for initiating combustion. Ignition system 290 may provide an ignition spark to cylinder 30 via spark plug 292 in response to spark advance signal SA from controller 12, under select operating modes. In other embodiments, compression-ignition engines may use a glow plug in place of spark plug 292.

In some embodiments, each cylinder of engine 10 may be configured with one or more injectors for delivering fuel to the cylinder 30. As a non-limiting example, cylinder 30 is shown including two fuel injectors 66 and 67. Fuel injectors 66 and 67 may be configured to deliver fuel received from fuel system 288 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 66 is shown coupled directly to cylinder 30 for injecting fuel directly therein in proportion to the pulse width of signal FPW-1 received from controller 12 via electronic driver 268. In this manner, fuel injector 66 provides what is known as direct injection (hereafter referred to as "DI") of fuel into combustion cylinder 30. While FIG. 2 shows injector 66 positioned to one side of cylinder 30, it may alternatively be located overhead of the piston, such as near the position of spark plug 292. Such a position may improve mixing and combustion when operating the engine with an alcohol-based fuel due to the lower volatility of some alcohol-based fuels. Alternatively, the injector may be located overhead and near the intake valve to improve mixing.

Fuel injector 67 is shown arranged in intake manifold 22, rather than in cylinder 30, in a configuration that provides what is known as port injection of fuel (hereafter referred to as "PFI") into the intake port upstream of cylinder 30. Fuel injector 67 may inject fuel, received from fuel system 288, in proportion to the pulse width of signal FPW-2 received from controller 12 via electronic driver 271. Note that a single electronic driver 268 or 271 may be used for both fuel injection systems, or multiple drivers, for example electronic driver 268 for fuel injector 66 and electronic driver 271 for fuel injector 67, may be used, as depicted.

Fuel may be delivered by both injectors to the cylinder during a single cycle of the cylinder. For example, each injector may deliver a portion of a total fuel injection that is combusted in cylinder 30. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 30.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 35 (e.g., downstream of turbine 116) to intake passage 42 (e.g., upstream of compressor 110) via LP-EGR passage 190. Further, an EGR sensor 245 may be arranged within the EGR passage 190 and may provide an indication of one or more of pressure, temperature, and concentration of the exhaust gas. Other non-limiting example EGR configurations may include HP-EGR (such as HP-EGR passage 84 of FIG. 1).

Controller 12 is shown as a microcomputer, including microprocessor unit 206, input/output ports 208, an electronic storage medium for executable programs and calibration values shown as read-only memory chip 210 in this particular example, random access memory 212, keep alive memory 214, and a data bus. Controller 12 may receive various signals from sensors coupled to engine 10, in addition to those signals previously discussed, including measurement of engine coolant temperature (ECT) from temperature sensor 216 coupled to cooling sleeve 218; a profile ignition pickup signal (PIP) from Hall effect sensor 220 (or other type) coupled to crankshaft 40; throttle position (TPS) from a throttle position sensor; and manifold absolute pressure signal (MAP) from sensor 224. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory chip 210 can be programmed with computer readable data representing instructions executable by microprocessor unit 206 for performing the methods described below as well as other variants that are anticipated but not specifically listed.

The controller 12 receives signals from the various sensors of FIGS. 1-2 and employs the various actuators of FIGS. 1-2 to adjust engine operation based on the received signals and instructions stored on a memory of the controller. For example, responsive to surge margin of a compressor operating point within a threshold, the controller may send a signal to a compressor actuator coupled to a sleeve of the compressor's active casing treatment to actuate the sleeve to a surge position where a surge port of the casing is open and a choke port of the casing is closed. As another example, responsive to choke margin of a compressor operating point within a threshold, the controller may send a signal to the actuator coupled to the sleeve of the compressor's active casing treatment to actuate the sleeve to a choke position where the choke port of the casing is open and the surge port of the casing is closed.

Turning now to FIG. 3, embodiment 300 shows a cross-sectional view of turbocharger 13 with an active casing treatment (ACT) 310, as shown in FIGS. 1 and 2. Components introduced in FIGS. 1 and 2 will be similarly numbered. Turbine 116 converts the energy of the exhaust gas into rotational energy for rotating drive shaft 19 connected to impeller 340. Exhaust gas from exhaust manifold 36 enters turbine housing 380 through turbine inlet 360. The exhaust gas flows through volute passage 382 (e.g., 382a, 382b) expanding through turbine outlet 365 and out exhaust passage 35. The flow of exhaust gas through turbine 116 generates a force on one or more blades 370 coupled to hub 390 causing the one or more blades 370, hub 390, and drive shaft 19 to rotate. Two blades, 370a and 370b, are shown in FIG. 3, but one skilled in the art will appreciate that more blades may be present in turbine 116. Turbine blades 370 (e.g., 370a, 370b) include inlet edge 370c, outlet edge 370d, hub edge 370e, and casing edge 370f. In another embodiment turbine 116 may be a variable geometry turbine, wherein exhaust flow through the turbine may be adjusted by actuating turbine actuator 117.

Compressor 110 includes impeller 340, diffuser 330 (e.g., 330a, 330b), compressor chamber 322 (e.g., 322a, 322b), ACT 310, and casing 320. ACT 310 includes ACT sleeve 311, and ACT sleeve actuation arm 313. A position of ACT sleeve 311 can be adjusted by actuating the ACT sleeve actuation arm 313 with controller 12. The rotation of impeller 340 draws charge air or gas into compressor 110 through compressor inlet 302 of casing 320. As non-limiting examples, the charge air or gas may include air from intake passage 42, exhaust gas (such as when EGR is active), gaseous fuel (such as when using port injection of fuel), and combinations thereof. This mixture of incoming gas may be collectively referred to as "gas flow" or "air flow." Gas flows from compressor inlet 302 and is accelerated by impeller 340 through diffuser 330 into compressor chamber 322. Diffuser 330 and compressor chamber 322 decelerate the gas causing an increase in pressure in compressor chambers 322a, 322b. Gas under pressure may flow from compressor chambers 322a, 322b to intake manifold 22.

Elements in turbocharger 13 may be described relative to the direction of the gas flow path through turbocharger 13. An element substantially in the direction of gas flow relative to a reference point is downstream from the reference point. An element substantially opposite the direction of gas flow relative to a reference point is upstream from the reference point. For example, compressor inlet 302 is upstream from impeller 340 which is upstream from diffuser 330. Diffuser 330 is downstream from impeller 340 which is downstream from compressor inlet 302.

Impeller 340 includes hub 354, full blade 350, and splitter 352. Full blade 350 and splitter 352 are attached to hub 354. The edge of full blade 350 that is most upstream in compressor 110 is the leading edge of full blade 350. Similarly, splitter 352 includes a leading edge at the most upstream portion of splitter 352. The leading edge of full blade 350 is upstream of splitter 352. Impeller 340 includes an axis of rotation aligned with the axis of rotation for drive shaft 19 and turbine hub 390. The axis of rotation is substantially parallel with the flow of gas at the compressor inlet and substantially perpendicular to the flow of gas at the diffuser.

Casing 320 includes compressor inlet 302, intake passage 304, recirculation passage 318, recirculation port 316, bleed passage 317, surge slot 312, and choke slot 314. Impeller 340 is contained in intake passage 304. Surge slot 312 is located on casing 320, downstream of the leading edge of full blade 350 and upstream of the leading edge of splitter 352. Choke slot 314 is downstream of the leading edge of splitter 352 and downstream of surge slot 312 on the casing 320. Recirculation port 316 is downstream of compressor inlet 302 and upstream of impeller 340. Recirculation port 316 is configured to enable gas to flow between intake passage 304 and recirculation passage 318.

ACT 310 includes a plurality of ports 315 cut into sleeve 311. ACT 310 is configured to control gas flow through compressor 110. Specifically, active casing treatment 310, controlled by controller 12 via signals sent to ACT sleeve actuation arm 313, may selectively control the flow of gas between intake passage 304 and recirculation passage 318 through one of surge slot 312 and choke slot 314. As elaborated below, during conditions when compressor surge may occur, such as at low mass flow conditions, active casing treatment 310 may enable gas to flow from intake passage 304 through surge slot 312 into recirculation passage 318. The gas further continues from recirculation passage 318 through recirculation port 316 into intake passage 304. Thus, the flow of gas striking the leading edge of full blade 350 may be greater than without allowing air to flow through surge slot 312. The additional flow of recirculating gas may enable the turbocharger compressor to operate with a lower air flow through compressor inlet 302 before surge occurs.

During conditions when compressor choke may occur, such as at high mass flow conditions, active casing treatment 310 may enable gas to flow from the impeller to the intake passage 304 via choke slot 314 and recirculation passage 318. During high mass flow conditions, a low pressure zone may be present in intake passage 304 downstream of the leading edge of splitter 352 adjacent to choke slot 314. The low pressure zone may induce gas to flow from intake passage 304 through recirculation port 316 and bleed passage 317 into recirculation passage 318 and then to the impeller through choke slot 314. The short-circuit path through recirculation passage 318 may enable the flow of gas through the compressor to be increased at high mass flow conditions when compared to a compressor without choke slot 314. In this way, the short-circuit flow of gas may enable more gas to flow before the turbocharger is in the choke operating condition.

Intake passage 304 may be substantially cylindrical. Recirculation passage 318 may be substantially annular since it is external to intake passage 304. The ports connecting intake passage 304 and recirculation passage 318, such as recirculation port 316, bleed passage 317, choke slot 314, and surge slot 312 may each be implemented with various means. For example, the ports may be constructed as one or more holes formed in the casing. As another example, the ports may be constructed as one or more slots extending around the circumference of the intake passage. The ports may have a uniform or non-uniform width along the length of the port from intake passage 304 to recirculation passage 318. Each port may have a centerline extending along the length of the port from intake passage 304 to recirculation passage 318. The centerline may be normal to the axis of rotation of impeller 340, or the centerline may have a non-zero slope when compared to the normal to the axis of rotation of impeller 340.

Active casing treatment 310 may be implemented in many ways. For example, a slideable casing sleeve 311 may be fitted in the recirculation passage to selectively block the flow of gas through choke slot 314 and/or surge slot 312. The casing sleeve may include one or more holes, ports, or slots 315 that are selectively alignable with choke slot 314 and/or surge slot 312 depending on the position of the casing sleeve. A position of the casing sleeve 311 may be adjusted by actuation of ACT sleeve arm 313 based on control signals received from controller 12. For example, responsive to low mass flow conditions or conditions when a compressor pressure ratio is within a surge margin to a surge limit, casing sleeve arm 313 may be actuated via signals commanded by controller 12 to a first position where slot 315 of the casing sleeve aligns with surge slot 312 but not choke slot 314. As a result, the casing sleeve may be adjusted so that surge slot 312 is open and choke slot 314 is blocked during low mass flow conditions. This allows gas to be recirculated from the impeller to the intake passage via the recirculation passage, moving compressor operation further away from the surge limit.

As another example, responsive to high mass flow conditions or conditions when a compressor pressure ratio is within a choke margin to a choke limit, casing sleeve arm 313 may be actuated via signals commanded by controller 12 to a second position (different from the first position) where port or slot 315 of the casing sleeve aligns with choke slot 314 but not surge slot 312. As a result, the casing sleeve may be adjusted so that choke slot 314 is open and surge slot 312 is blocked during high mass flow conditions. This allows gas to be recirculated from the intake passage to the impeller via the choke slot passage, moving compressor operation further away from the choke limit.

In other examples, responsive to a controller 12 command to adjust the position of the active casing treatment, casing sleeve 310 may slide or rotate such that it does not overlap or impede the intended port (e.g., choke slot 314 or surge slot 312) in any way, thereby selectively opening choke slot 314 or surge slot 312. These positions will be described further with reference to FIGS. 4A-4B. In an alternative embodiment, active casing treatment 310 may be adjusted based on a pressure differential across compressor inlet 304 and intake manifold 44. In yet another alternative embodiment, active casing treatment 310 may be adjusted based on a pressure differential across intake manifold 44 and turbine inlet 360. It will be understood that these specific embodiments are presented for example, and are not intended to be limiting in any manner.

Figure 4A:
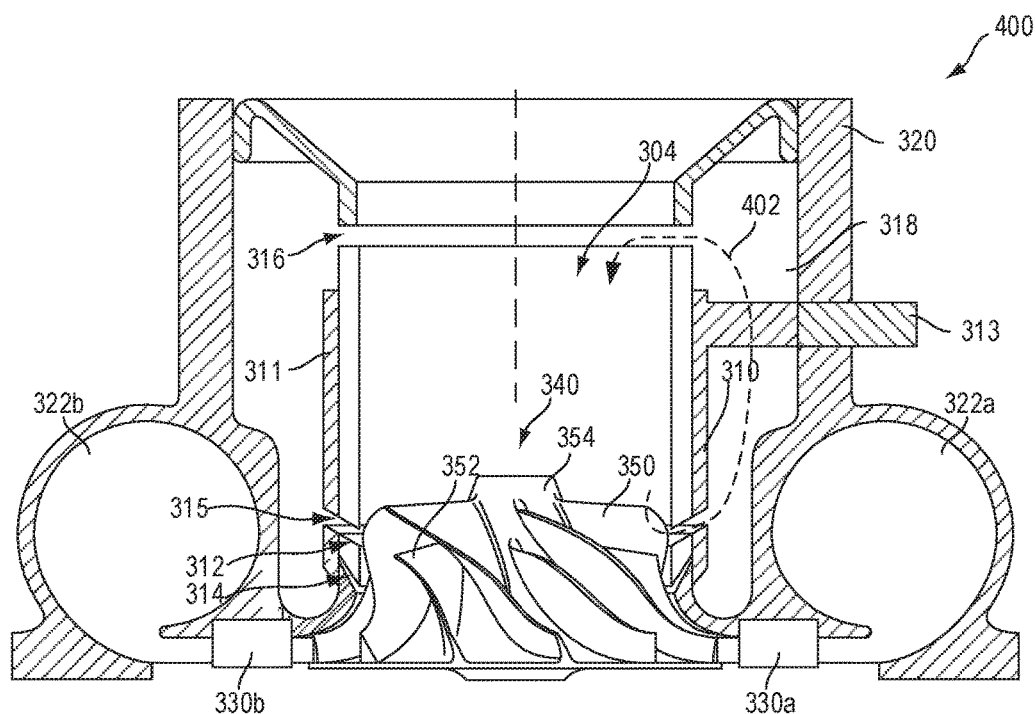
FIG. 4A shows actuation of a sleeve of the active casing treatment to a surge position.
Figure 4B:
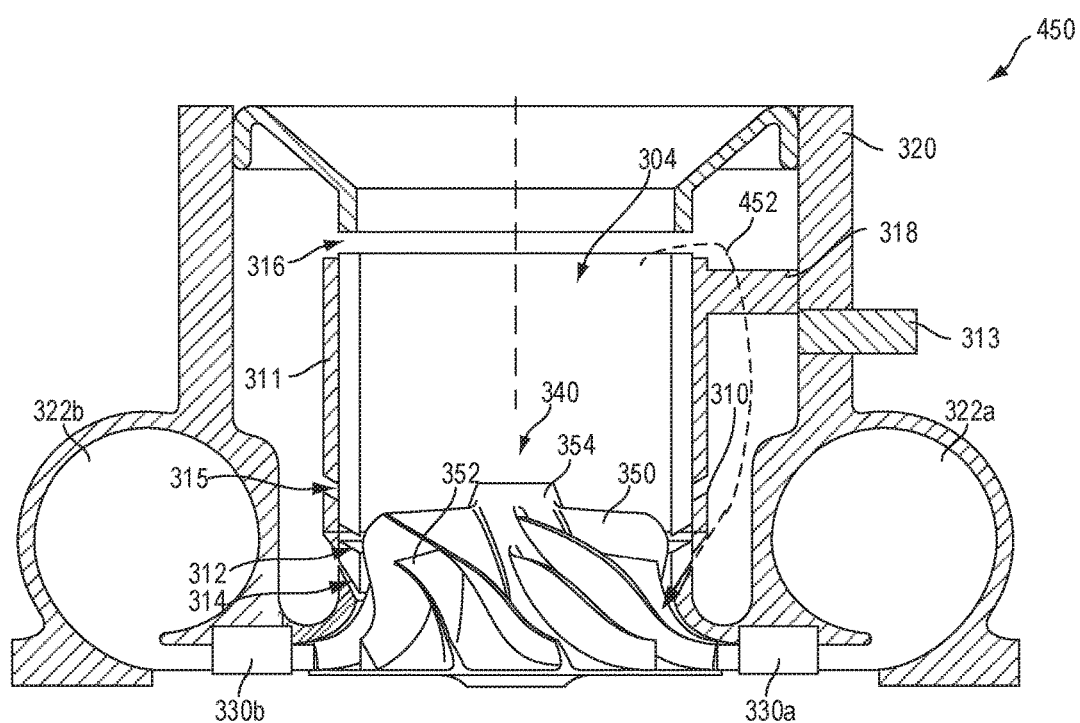
FIG. 4B shows actuation of a sleeve of the active casing treatment to a choke position.

Turning now to FIGS. 4A-4B, example actuation of a sleeve of a compressor active casing treatment (such as ACT sleeve 311 of FIG. 3) and the resulting flow patterns through the compressor are shown. Embodiment 400 of FIG. 4A shows a view of the cross-section of FIG. 3 with the sleeve of the active casing treatment in a surge position that enables surge control. Embodiment 450 of FIG. 4B shows a view of the cross-section of FIG. 3 with the sleeve of the active casing treatment in a choke position that enables choke control. It will be appreciated that all components shown in FIGS. 4A-4B have been introduced earlier, and are therefore not re-introduced here.

FIG. 4A shows a first example positioning 400 of the active casing treatment 311 responsive to a low mass flow conditions that may cause the compressor to operate within a threshold of a surge limit. For example, responsive to a compressor pressure ratio being within a surge margin to a surge limit, the controller may send a control signal to ACT sleeve arm 313 to move ACT sleeve 311 to a first position where slot 315 overlaps the surge port 312. In this position, the surge port is open and the choke port is closed. As a result of actuating the sleeve to the first position, active casing treatment 310 may enable air to flow from intake passage 304 through surge slot 312 and slot 315 into recirculation passage 318 during low mass flow conditions. The air flow then continues from recirculation passage 318 through recirculation port 316 into intake passage 304, as shown by dashed arrow 402. Thus, the flow of air charge striking the leading edge of full blade 350 may be greater than when surge slot 312 is left closed/blocked by the sleeve (as shown in FIG. 4B). The recirculation of charge may enable the turbocharger compressor to operate with less flow through the compressor, reducing surge occurrence.

FIG. 4B shows a second example positioning 450 of the active casing treatment 310 responsive to a high mass flow condition that may cause the compressor to operate within a threshold of a choke limit. For example, responsive to a compressor pressure ratio being within a choke margin to a choke limit, the controller may send a control signal to ACT sleeve arm 313 to move the ACT sleeve 311 to a second position where slot 315 overlaps the choke port. In this position, the surge port is closed and the choke port is open. In particular, during high mass flow conditions, a low pressure zone may be present in intake passage 304 downstream of the leading edge of splitter 352 adjacent to choke slot 314. The low pressure zone may induce gas to flow from intake passage 304 through recirculation port 316 into recirculation passage 318 through choke slot 314 back into intake passage 304, as shown by 452. The short-circuit path through recirculation passage 318 may enable the flow of gas through the compressor to be increased at high mass flow conditions when compared to a compressor without choke slot 314. In this way, the short-circuit flow of gas may enable more gas to flow before the turbocharger is in the choke operating condition.

It will be appreciated that the ACT mechanism of FIG. 3 and FIGS. 4A-4B depict a movable sleeve in a three-position system that regulates the opening of two distinct flow channels in the compressor, viz. the choke slot and the surge slot. Herein, the three positions include nominal position (where both the choke slot and the surge slot are closed), surge position (where only the choke slot is closed), and choke position (where only the surge slot is closed). However, in alternate embodiments, the ACT mechanism may be coupled in a two-position system having only one controlled slot, viz. the choke slot. Therein, the two positions are the nominal position (where the choke slot is closed) and choke position (where the choke slot is open), wherein the surge slot is uncontrolled and operates via passive operation and default nominal provides increased surge margin.

FIG. 3 and FIGS. 4A-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, the components of FIGS. 1-4B provide a boosted engine system comprising an engine; an intake compressor having an impeller, a choke slot, a surge slot, an actuatable annular casing housing the impeller, the casing comprising a sleeve slot, and an actuator coupled to a sleeve of the casing; an exhaust turbine; EGR valve coupled to EGR passage for recirculating exhaust gas from engine output to engine input; a pedal for receiving operator torque demand; and a controller. The controller may be programed to control a gas flow and a pressure via a feedback control loop. The controller may further be programed to actuate the ACT casing responsive to predicted compressor surge or choke. While actuating the ACT casing, the controller also adjusting EGR flow and turbine flow via feedforward control signals to reduce disturbance in the gas flow and the pressure due to ACT actuation.

FIG. 5 shows an example control block 500 for controlling gas flow and pressure of engine 515. Control block 500 includes a feedback control loop 510 and a feedforward control block 520. Feedback control loop controls the engine gas flow and pressure to desired gas flow 504 and desired pressure 503 based on feedback from measured gas flow 517 and measured pressure 516. The engine gas flow may include one or more of EGR flow, mass air flow into the cylinder, or exhaust gas flow. The engine pressure may include one or more of engine intake manifold pressure, boost pressure, and engine exhaust manifold pressure. The engine gas flow and pressure may be adjusted by actuating a first actuator with control signal 512, and a second actuator with control signal 513. In an example, the first actuator may be used to control EGR flow, and the second actuator may be used to control turbine flow. In another example, the first actuator may include EGR valve. In another example, the first actuator may include both the EGR valve and the throttle (such as throttle 20 of FIG. 1). Feedback control signals 507 and 508 may be generated by feedback controller 514 based on inputs including engine speed 501, fueling parameters 502, gas flow error 505, and pressure error 506. Gas flow error 505 is the difference between the desired gas flow 504 and the measured gas flow 517. Pressure error is the difference between the desired pressure 503 and the measured pressure 516. The first and second actuators are actuated by control signals 512 and 513. If the compressor geometry is not adjusted, the first and second actuators are actuated directly by control signal 507 and 508. In other words, when the compressor actuator is not actuated, control signal 512 equals feedback control signal 507, and control signal 513 equals feedback control signal 508. During compressor geometry adjustment, control signal to the first or second actuator is based on the feedback control signal and a feedforward control signal. For example, control signal 512 to the first actuator equals the difference between feedback control signal 507 and feedforward control signal 509; control signal 513 to the second actuator equals to the difference between feedback control signal 508 and the feedforward control signal 511.

The feedforward control signals 509 and 511 are generated by feedforward controller 524 based on compressor geometry error 523 between desired compressor geometry/position 512 and measured compressor geometry/position 522. In one example, compressor geometry error 523 may be the amount of adjustment in compressor geometry. In another example, compressor geometry error 523 may be the change in compressor actuator position from a current compressor actuator position to a desired compressor actuator position. Compressor geometry 523 may be used to actuate the compressor actuator. As an example, feedforward controller 524 may compute the feedforward control signals based on a sensitivity of the EGR flow with respective to the first actuator, a sensitivity of the EGR flow with respective to the second actuator, a sensitivity of the pressure with respective to the second actuator, a sensitivity of the pressure with respective to the first actuator, a sensitivity of the EGR flow with respective to the compressor actuator, and a sensitivity of the pressure with respective to the compressor actuator. Details of the feedforward controller 524 is further presented in FIG. 6.

FIG. 6 shows an example method 600 for controlling an engine system including a variable geometry compressor. In particular, a gas flow and a pressure of the engine system are controlled via a feedback control loop (such as feedback control loop 510 of FIG. 5). Responsive to compressor surge or choke, concurrently adjusting EGR flow, turbine flow, and compressor geometry via both the feedback control loop and a feedforward control block (such as feedforward control block 520 of FIG. 5), to maintain substantially constant (e.g., within 5% of the average) gas flow and pressure. The adjustment in EGR flow and the turbine flow are determined based on the amount of compressor geometry adjustment. After adjusting the compressor geometry, the gas flow and the manifold pressure are controlled by only the feedback control loop, without the feedforward control block.

Instructions for carrying out method 600 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 601, method 600 estimates and/or measures engine operating conditions including, but not limited to, engine speed, fuel amount, fuel pressure, operator torque demand, engine coolant temperature (ECT), barometric pressure (BP), boost pressure, intake manifold pressure (boost pressure), exhaust manifold pressure, mass airflow rate (MAF), exhaust air flow rate, an accelerator pedal position (PP), EGR flow, and EGR rates as may be measured and/or estimated by the output of respective sensors described in reference to FIGS. 1 and 2.

At 602, method 600 measures or estimates a gas flow and a pressure that are controlled via the feedback control loop (such as feedback control loop 510 of FIG. 5). In on example, the gas flow may be exhaust gas flow. In another example, the gas flow may be mass air flow. In yet another example, the gas flow may be exhaust gas flow. The manifold pressure may be either intake manifold pressure (boost pressure) or exhaust manifold pressure. In another example, EGR rates and a boost pressure are controlled via the feedback control loop.

At 603, the gas flow and the pressure may be adjusted based on the measurement at 602 via the feedback control loop. Specifically, control signals to engine actuators may be determined by a feedback controller (such as feedback controller 514 of FIG. 5) based on the difference between desired gas flow and manifold pressure and the measured gas flow and manifold pressure. The feedback controller may be, for example, a PID controller. The feedback control signals to the engine actuators may further be determined based on engine operating parameters such as engine speed and fueling. The engine actuators may include a first actuator for controlling EGR flow, and a second actuator for controlling turbine flow. Based on the control signals (such as control signals 507 and 508 of FIG. 5), the actuators are operated to adjust the gas flow and the pressure to desired setpoints.

At 604, method 600 determines whether to adjust geometry or position of the compressor. The controller (such as controller 12 of FIG. 1) may determine whether to adjust the compressor based on current compressor operating point within a compressor map (such as map 800 of FIG. 8). The compressor operating point may include air flow rate through the compressor and pressure ratio across the compressor. In one embodiment, compressor geometry may be adjusted responsive to surge margin or choke margin less than a threshold. In another embodiment, compressor geometry may be adjusted responsive to compressor operating in the surge or choke region. In another embodiment, compressor geometry may be adjusted based on compressor efficiency. For example, compressor may be adjusted if the compressor efficiency may be improved. In yet another embodiment, compressor geometry may be adjusted based on driver behavior, such as frequent actuation of the accelerator paddle or brake paddle.

In one embodiment, the compressor includes ACT, and the compressor geometry may be adjusted by actuating the casing sleeve to align the sleeve from a nominal position to a surge or choke slot. For example, responsive to a heavy tip-out, responsive to a compressor surge margin less than a threshold, the controller may determine to adjust compressor geometry by actuating the ACT and move the compressor from a nominal position to a surge position, wherein the casing sleeve is aligned with the surge slot. As another example, after moving the compressor to the surge position, responsive to increased compressor air flow and reduced compressor pressure ratio, the controller may determine to adjust the compressor geometry by actuating the compressor from the surge position to the nominal position for improved compressor efficiency.

If the controller determines not to adjust the compressor, method 600 moves to 605, wherein engine operating conditions are continuously monitored. Otherwise, if the controller determines to adjust the compressor.

At 606, the controller determines a desired compressor geometry. In one embodiment, the desired compressor geometry may be position of the ACT compressor, such as surge position, nominal position, and choke position. In another embodiment, the desired compressor geometry may be a desired opening angle of compressor vanes. The desired compressor geometry may be determined based on the compressor operating point and the compressor map. For example, the desired opening angle of compressor vanes may decrease with decreased surge margin. As another example, the ACT actuator may be moved to open the surge slot responsive to decreased surge margin.

The controller may further determines a desired compressor operating point after adjusting the compressor geometry. The desired compressor operating point may be determined based on the desired boost pressure and fresh air flow as determined during engine mapping.

At 607, method 600 determines a first amount of compressor geometry adjustment, a second amount of adjustment in EGR flow, and a third amount of adjustment in turbine flow. The amount of compressor geometry adjustment may be obtained by comparing the desired compressor geometry with measured compressor geometry. In an example, the amount of compressor geometry adjustment corresponds to an amount of change in the compressor actuator position.

In one embodiment, the compressor includes ACT, and the amount of compressor adjustment may be the change of air flow from the current compressor position to the desired compressor position. For example, amount of compressor adjustment may be the change of air flow from a nominal compressor position to a surge position, or the change of air flow from a compressor surge position to a nominal position.

In another embodiment, the compressor may be a variable geometry compressor with adjustable vanes, wherein the compressor geometry may be continuous adjusted via the compressor actuator. As an example, the amount of compressor adjustment may be quantified and converted to an amount of change in the compressor actuator position. As another example, the amount of compressor adjustment may be the change of vane position (in degrees).

The second amount of adjustment to EGR flow and the third amount of adjustment to turbine flow may be determined based on the amount of compressor geometry adjustment. As one example, the EGR flow is adjusted via a first actuator, and turbine flow is adjusted via a second actuator. The change, or amount of adjustment, in EGR flow and turbine flow may be calculated based on the change in the position of the compressor actuator, a sensitivity of the EGR flow with respective to the first actuator, a sensitivity of the EGR flow with respective to the second actuator, a sensitivity of the pressure with respective to the second actuator, a sensitivity of the pressure with respective to the first actuator, a sensitivity of the EGR flow with respective to the third actuator, and a sensitivity of the pressure with respective to the third actuator. The sensitivity of a flow with respective to an actuator is defined as a variation in flow rate of the flow caused by a variation of the actuator.

In one embodiment, a gas flow and a pressure are controlled via the feedback control loop. Predicted change in the gas flow ΔF and the pressure Δp due to compressor geometry adjustment may be calculated depicted as $$\begin{bmatrix} \Delta F \\ \Delta p \end{bmatrix} = \begin{bmatrix} dF/dvgc \\ dp/dvgc \end{bmatrix} \Delta vgc = B \cdot \Delta vgc, \quad \text{Equation 1}$$

wherein Δvgc is the amount of compressor geometry adjustment; dF/dvgc and dp/dvgc are sensitivities of the gas flow and pressure with respect to the compressor actuator, respectively. The expected change in gas flow ΔF and the pressure Δp due to compressor geometry adjustment may alternatively be depicted as $$\begin{bmatrix} \Delta F \\ \Delta p \end{bmatrix} = \begin{bmatrix} dF/degr & dF/dvgt \\ dp/degr & dp/dvgt \end{bmatrix} \begin{bmatrix} \Delta egr \\ \Delta vgt \end{bmatrix} = A \cdot \begin{bmatrix} \Delta egr \\ \Delta vgt \end{bmatrix}, \quad \text{Equation 2}$$

wherein Δegr and Δvgt are the amount of change in EGR flow and turbine flow; dF/degree, dF/dvgt, dp/dvgt, and dp/dvgt are the sensitivity of the gas flow with respective to the first actuator, sensitivity of the gas flow with respective to the second actuator, sensitivity of the pressure with respective to the first actuator, and sensitivity of the pressure with respective to the second actuator.

From Equations 1 and 2, the amount of change or adjustment in EGR flow and turbine flow may be calculated via feedforward controller (such as feedforward controller 524 of FIG. 5) from the amount of compressor geometry adjustment via $$\begin{bmatrix} \Delta egr \\ \Delta vgt \end{bmatrix} = A^{-1} B \cdot \Delta vgc. \quad \text{Equation 3}$$

The adjustment in EGR flow and turbine flow may be subtracted from the feedback control signal to actuate the first and second actuators to reduce the disturbance in the gas flow and pressure due to compressor geometry adjustment.

At 608, the EGR flow and turbine flow are adjusted based on the determined amount of adjustment of EGR flow and turbine flow at 507, while compressor actuator is actuated to move the compressor to the desired compressor geometry.

At 609, method 600 checks whether the compressor has been adjusted to the desired geometry determined at 606. If the answer is yes, method 600 moves to 611. If the answer is no, method 600 moves to 610, wherein the compressor geometry is continuously adjusted, and the EGR flow and turbine flow are also continuously adjusted while the compressor actuator is actuated.

At 611, after adjusting the compressor geometry, the gas flow and the pressure are controlled via the feedback control loop, without the feedforward control bock. In other words, the control signals (such as 509 and 511 of FIG. 5) generated by the feedforward control loop are zero. Further, the EGR flow and turbine flow may be adjusted to move the compressor operating point to the desired compressor operating point at 606.

By adjusting the EGR flow and turbine flow based on the predicted change caused by compressor geometry adjustment, method 600 may maintain substantially constant engine gas flow and pressure during compressor actuator operation. Therefore, transient disturbance due to compressor adjustment may be prevented or reduced.

FIG. 7 shows example timelines of engine operating parameters (accelerator pedal pressure 710, boost pressure 720, compressor pressure ratio 730, and EGR rates 750) and status of engine actuators (ACT 740, EGR valve 760, and VGT vane 770) while implementing the method of FIG. 6. The compressor of the engine includes an ACT and is coupled to a VGT.

At t1, responsive to an increase in accelerator pedal pressure, boost pressure and compressor pressure ratio increase. The ACT is at a nominal position. The EGR valve opening may start decrease responsive to increased boost pressure, and the EGR rates may correspondingly decrease. The degree of opening of VGT vane is high.

From t1 to t2, the boost pressure and the EGR rates are controlled to desired values via a feedback control loop (such as feedback control loop 510 of FIG. 5), while compressor geometry is not adjusted (ACT remains at nominal position). The boost pressure and EGR rates are adjusted by actuating the EGR valve and VGT vane via feedback control signals (such as control signals 507 and 508 of FIG. 5). With increased accelerator pedal pressure, opening of EGR valve decreases, and opening of VGT vane decreases.

From t2 to t3, accelerator pedal pressure remains high. Based on the feedback control, the boost pressure remains at high level and the EGR rates remains at a low level.

At t3, responsive to a steep decrease of accelerator pedal pressure from a high level, the controller (such as controller 12 of FIG. 1) determines that the surge may occur and starts actuating the ACT from the nominal position to the surge slot. The EGR valve and VGT vane are actuated at the same time to offset potential transient increase 721 of boost pressure and transient increase 751 of EGR rates. For example, feedforward control signals (such as 509 and 511 of FIG. 5) may be subtracted from the feedback control signals to actuate the EGR vales and the VGT vanes. As such, opening of EGR valve may be lower than EGR valve opening 761 based solely on the feedback control signal; VGT vane opening may be greater than VGT vane opening 771 based solely on the feedback control signal. In this way, boost pressure and EGR rates remain substantially constant (e.g., within 5% of the average) during and immediately after actuating the ACT.

At t4, after actuating ACT, the EGR rates and the boost pressure is controlled by the feedback control loop, without the feedforward control block. The EGR valve and the VGT vane may be actuated to move the compressor operating point to an optimal position.

At t5, based on the engine operating conditions, the controller may determine to adjust ACT from the surge position to the nominal position. As one example, the controller may adjust ACT to improve compressor efficiency. The EGR valve and the VGT vane are actuated by the feedback control signal and the feedforward control signal to reduce the disturbance 722 of boost pressure and disturbance 752 of EGR rates. For example, opening of the EGR valve may be greater than the than the valve opening 762 adjusted without the feedforward control signal. VGT vanes may be more closed comparing to the VGT vanes adjusted without the feedforward control signal 772. As a result, the boost pressure and the EGR rates remains substantially constant during and immediately after ACT activation from t5 to t6. By adjusting the ACT to the surge slot, compressor pressure ratio does not further increase as shown in 731, and compressor surge is prevented by improving the surge margin.

From t6 to t7, the boost pressure and the EGR rates are controlled only via the feedback control loop.

At t7, accelerator pedal pressure increases steeply from a low pressure to a high pressure. The controller determines that compressor choke may occur and actuates ACT from the nominal position to the choke position. EGR valve and the VGT vane are also actuated to offset the disturbance due to ACT adjustment. For example, EGR valve opening may increase comparing to the EGR valve opening 763 actuated only by the feedback control signal. In another example, EGR flow may be allocated to both HP-EGR flow and LP-EGR flow. If the HP-EGR valve is at its maximum opening, opening of the LP-EGR valve may be increased to increase EGR flow. VGT vane opening may decrease comparing to the VGT vane opening 773, which actuated only by the feedback control signal. By adjusting the EGR flow and the turbine flow while actuating the ACT, engine boost pressure and the EGT rate remain substantially constant during and immediately after ACT actuation. By actuating ACT, compressor pressure ratio does not fall as illustrated by 732, and compressor choke may be prevented by extending choke flow capacity.

At t8, ACT may be activated from choke position to the nominal position after increased air flow through the compressor. EGR valve and the VGT vane are concurrently activated with the ACT to reduce transient increase 724 of boost pressure and transient increase 754 of EGR rates. For example, EGR valve opening may decrease comparing to the EGR valve opening 764 actuated only by the feedback control signal. VGT vane opening may increase comparing to the VGT vane 774 actuated only by the feedback control signal.

In another embodiment, the turbine flow may be adjusted by actuating a wastegate instead or together with the VGT vane.

FIG. 8 shows an example compressor map 800 of compressor pressure ratio (along the y-axis) at different compressor flow rates (along the x-axis). Line 809 indicate isentropic efficiency. Line 802 (solid) indicates surge limit (e.g., a hard surge limit) while line 804 (dashed) indicates choke limit. Solid lines 806 depict the substantially constant compressor speed lines. Compressor operation to the left of surge limit results in turbocharger compressor operation in a surge region. Likewise, compressor operation to the right of choke limit 804 results in turbocharger compressor operation in a choke region. Compressor operation in both the surge region and the choke region results in objectionable NVH and potential degradation of boosted engine performance.

As an example, the surge margin may be determined as:

Surge margin=(massFlowRate_nom−massFlowRate_surgeLine)/(massFlowRate_nom), where massFlowRate_nom is the nominal mass flow rate, and massFlowRate_surgeLine is the mass flow rate at the surge line. All mass flows may be calculated at the same corrected compressor speed from the compressor map. A choke margin may be similarly determined. For example, surge margin for operating point 820 is 807; choke margin for operating point 830 is 808.

Adjusting the compressor geometry or position may expand compressor operating range and improve compressor efficiency. For example, adjusting compressor geometry may change the isentropic efficiency from 812 to 810. As a result, the surge margin may also be increased.

In this way, disturbance in engine operating parameters due to compressor geometry adjustment may be avoided by introducing a feedforward control signal to control the EGR flow and turbine flow. The feedforward control signal may be introduced concurrently with the activation of the compressor actuator. Technical effect of adjusting the compressor geometry is that compressor surge margin or choke margin may be improved, and compressor may reliably providing boost pressure. Further, compressor efficiency may be improved. Technical effect of adjusting the turbine flow and the EGR flow while adjusting compressor geometry is to avoid disturbance of the feedback controlled engine operating parameters.

As one embodiment, a method for an engine includes adjusting an exhaust gas recirculation (EGR) flow via a first actuator and a turbine flow via a second actuator while adjusting a geometry of a compressor, wherein the EGR flow and the turbine flow are adjusted based on the adjustment of the compressor geometry. In a first example of the method, wherein the EGR flow and the turbine flow are adjusted to maintain a substantially constant gas flow and a substantially constant pressure during the compressor geometry adjustment. A second example of the method optionally includes the first example and further includes wherein the gas flow includes a mass air flow, and the first actuator includes a throttle. A third example of the method optionally includes one or more of the first and second examples, and further includes wherein the gas flow includes the EGR flow, and the first actuator includes an EGR valve. A fourth example of the method optionally includes one or more of the first through third examples, and further includes wherein the first actuator further includes a throttle. A fifth example of the method optionally includes one or more of the first through fourth examples, and further includes wherein the pressure is an exhaust pressure or a boost pressure. A sixth example of the method optionally includes one or more of the first through fifth examples, and further includes the second actuator is a wastegate or a variable geometry turbine. A seventh example of the method optionally includes one or more of the first through sixth examples, and further includes measuring the gas flow and the pressure, and adjusting the gas flow and the pressure based on the measured gas flow and the measured pressure without adjusting the geometry of the compressor. A eighth example of the method optionally includes one or more of the first through seventh examples, and further includes wherein the geometry of the compressor is adjusted via a third actuator, and a change in the position of the third actuator determined based on an amount of the compressor geometry adjustment. A ninth example of the method optionally includes one or more of the first through eighth examples, and further includes adjusting the EGR flow and the turbine flow based on the change in the position of the third actuator, a sensitivity of the EGR flow with respective to the first actuator, a sensitivity of the EGR flow with respective to the second actuator, a sensitivity of the pressure with respective to the second actuator, a sensitivity of the pressure with respective to the first actuator, a sensitivity of the EGR flow with respective to the third actuator, and a sensitivity of the pressure with respective to the third actuator.

As another embodiment, a method for a turbocharged engine comprises adjusting an EGR flow and a turbine flow responsive to an EGR rates and a boost pressure; determining a first amount of compressor geometry adjustment; determining a second amount of EGR flow adjustment and a third amount of turbine flow adjustment based on the first amount of compressor geometry adjustment; and concurrently adjusting a compressor geometry with the first amount, the EGR flow with the second amount, and the turbine flow with the third amount. In a first example of the method, wherein the EGR rates and the boost pressure remain substantially constant while adjusting the compressor geometry. A second example of the method optionally includes the first example and further includes wherein the EGR flow is adjusted by actuating an EGR valve and a throttle. A third example of the method optionally includes one or more of the first and second examples, and further includes after adjusting the compressor geometry, adjusting the EGR flow and the turbine flow responsive to the EGR rates and the boost pressure. A fourth example of the method optionally includes one or more of the first and third examples, and further includes adjusting the EGR flow and the turbine flow based on the EGR rates and the boost pressure while adjusting the compressor geometry.

As another embodiment, an engine system, comprises a compressor for supplying a boosted air to an engine, wherein a geometry of the compressor adjustable by actuating a compressor actuator; a turbine coupled to the compressor; an EGR passage for circulating an exhaust gas from engine output to engine intake; an EGR valve coupled to the EGR passage for controlling an EGR flow; a first sensor coupled to the engine for measuring a gas flow; a second sensor coupled to the engine for measuring a manifold pressure; and a controller with computer readable instructions stored on non-transitory memory configured for: adjusting the gas flow and the manifold pressure based on outputs of the first sensor and the second sensor; determining an amount of adjustment in the compressor actuator; determining an expected change in the gas flow and an expected change in the manifold pressure based on the amount of adjustment in the compressor actuator; actuating the compressor actuator by the determined amount of adjustment; and while actuating the compressor actuator, adjusting the EGR flow and a turbine flow to compensate for the expected change in gas flow and the expected change in manifold pressure. In a first example of the system, the controller is further configured for adjusting the gas flow and the manifold pressure based on outputs of the first sensor and the second sensor after actuating the compressor actuator. A second example of the system optionally includes the first example and further includes wherein a pressure ratio across the compressor remains substantially constant while actuating the compressor actuator. A third example of the method optionally includes one or more of the first and second systems, and further includes wherein the compressor is an active casing compressor, the amount of change in the actuator is a first amount when the compressor is adjusted from a norminal position to a surge position, and amount of change in the actuator is a second amount when the compressor is adjusted from a norminal position to a choke position. A fourth example of the method optionally includes one or more of the first and third systems, and further includes wherein the EGR passage includes low pressure EGR passage and high pressure EGR passage, and adjusting the EGR flow further comprises allocating EGR flow between a low pressure EGR passage and a high pressure EGR passage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising:
adjusting an exhaust gas recirculation (EGR) flow via a first actuator and a turbine flow via a second actuator while adjusting a geometry of a compressor, wherein the first actuator and the second actuator are adjusted via a controller based on an adjustment of the compressor geometry, and wherein adjusting the EGR flow further comprises allocating EGR flow between a low pressure EGR passage and a high pressure EGR passage.

2. The method of claim 1, further comprising adjusting the EGR flow and the turbine flow via the controller to maintain a substantially constant gas flow and a substantially constant pressure during the compressor geometry adjustment.

3. The method of claim 2, wherein the gas flow includes a mass air flow, and the first actuator includes a throttle.

4. The method of claim 2, wherein the gas flow includes the EGR flow, and the first actuator includes an EGR valve.

5. The method of claim 4, further comprising adjusting the gas flow via a throttle.

6. The method of claim 2, wherein the pressure is an exhaust pressure or a boost pressure.

7. The method of claim 2, wherein the second actuator is a wastegate or a variable geometry turbine.

8. The method of claim 2, further comprising measuring the gas flow and the pressure via the controller, and adjusting the gas flow and the pressure based on the measured gas flow and the measured pressure without adjusting the geometry of the compressor via the controller.

9. The method of claim 1, further comprising adjusting the geometry of the compressor via a third actuator and the controller, and where a change in a position of the third actuator is determined via the controller based on an amount of the compressor geometry adjustment.

10. The method of claim 9, further comprising adjusting the EGR flow and the turbine flow via the controller based on the change in the position of the third actuator, a sensitivity of the EGR flow with respect to the first actuator, a sensitivity of the EGR flow with respect to the second actuator, a sensitivity of the pressure with respect to the second actuator, a sensitivity of the pressure with respect to the first actuator, a sensitivity of the EGR flow with respect to the third actuator, and a sensitivity of the pressure with respect to the third actuator.

11. A method for adjusting exhaust gas recirculation (EGR) of a turbocharged engine, comprising:
adjusting an EGR flow and a turbine flow via a controller responsive to EGR rates and a boost pressure;
determining a first amount of compressor geometry adjustment via the controller;
determining a second amount of EGR flow adjustment and a third amount of turbine flow adjustment via the controller based on the first amount of compressor geometry adjustment; and
concurrently adjusting a compressor geometry with the first amount, the EGR flow with the second amount, and the turbine flow with the third amount via the controller.

12. The method of claim 11, further comprising maintaining the EGR rates and the boost pressure substantially constant via the controller while adjusting the compressor geometry via the controller.

13. The method of claim 11, further comprising adjusting the EGR flow by actuating an EGR valve and a throttle via the controller.

14. The method of claim 11, further comprising after adjusting the compressor geometry, adjusting the EGR flow and the turbine flow responsive to the EGR rates and the boost pressure via the controller.

15. The method of claim 11, further comprising adjusting the EGR flow and the turbine flow based on the EGR rates and the boost pressure via the controller while adjusting the compressor geometry via the controller.

16. An engine system, comprising:
a compressor for supplying a boosted air to an engine, wherein a geometry of the compressor is adjustable by actuating a compressor actuator;
a turbine coupled to the compressor;
an EGR passage for circulating an exhaust gas from engine output to engine intake, wherein the EGR passage includes a low pressure EGR passage and a high pressure EGR passage;
an EGR valve coupled to the EGR passage for controlling an EGR flow;
a first sensor coupled to the engine for measuring a gas flow;
a second sensor coupled to the engine for measuring a manifold pressure; and
a controller with computer readable instructions stored on non-transitory memory configured for:
adjusting the gas flow and the manifold pressure based on outputs of the first sensor and the second sensor via the controller;
determining an amount of adjustment in the compressor actuator via the controller;
determining an expected change in the gas flow and an expected change in the manifold pressure based on the amount of adjustment in the compressor actuator via the controller;
actuating the compressor actuator by the determined amount of adjustment via the controller; and
while actuating the compressor actuator, adjusting the EGR flow and a turbine flow to compensate for the expected change in gas flow and the expected change in manifold pressure via the controller, and wherein adjusting the EGR flow further comprises allocating EGR flow between the low pressure EGR passage and the high pressure EGR passage.

17. The engine system of claim 16, wherein the controller is further configured for adjusting the gas flow and the manifold pressure based on outputs of the first sensor and the second sensor after actuating the compressor actuator.

18. The engine system of claim 16, wherein a pressure ratio across the compressor is maintained substantially constant via the controller while actuating the compressor actuator via the controller.

19. The engine system of claim 16, wherein the compressor is an active casing compressor, an amount of change in the actuator is a first amount when the compressor is adjusted from a nominal position to a surge position, and an amount of change in the actuator is a second amount when the compressor is adjusted from the nominal position to a choke position.

* * * * *